United States Patent
Sun et al.

(10) Patent No.: US 12,423,287 B2
(45) Date of Patent: Sep. 23, 2025

(54) SELF-MAINTAINED TABLESPACE

(71) Applicant: INTERNATIONAL BUSINESS MACHINES CORPORATION, Armonk, NY (US)

(72) Inventors: Sheng Yan Sun, Beijing (CN); Peng Hui Jiang, Beijing (CN); Jie Ling, Beijing (CN); Shan Jiang, Beijing (CN); Yu Huang, Beijing (CN); Yan Li Ma, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/513,985

(22) Filed: Nov. 20, 2023

(65) Prior Publication Data

US 2025/0165450 A1   May 22, 2025

(51) Int. Cl.
*G06F 16/22* (2019.01)
*G06F 16/27* (2019.01)

(52) U.S. Cl.
CPC ........ *G06F 16/2282* (2019.01); *G06F 16/278* (2019.01)

(58) Field of Classification Search
CPC .. G06F 16/2282; G06F 16/278; G06F 3/0644; G06F 12/1441; G06F 16/13; G06F 16/244; G06F 9/5077; G06F 9/5061; G06F 18/241; G06F 18/24147; G06F 18/2137; G06F 9/5066; G06N 3/08; G06N 20/00; G06N 3/045; G06N 5/01; G06N 5/025

USPC ......................................................... 707/812
See application file for complete search history.

(56) References Cited

U.S. PATENT DOCUMENTS

| | | | |
|---|---|---|---|
| 6,269,375 B1 | 7/2001 | Ruddy et al. | |
| 7,716,177 B2 | 5/2010 | Zhang et al. | |
| 9,053,167 B1 * | 6/2015 | Swift | G06F 16/27 |
| 9,177,004 B2 | 11/2015 | Bright | |
| 9,734,226 B2 | 8/2017 | Ng et al. | |

(Continued)

OTHER PUBLICATIONS

IBM, "Changing the boundary between partitions", https://www.ibm.com/docs/en/db2-for-zos/12?topic=partitions-changing-boundary-between, Accessed Aug. 22, 2023; 4 Pages.

(Continued)

*Primary Examiner* — Evan Aspinwall
(74) *Attorney, Agent, or Firm* — Lily Neff; Andrew D. Wright; Calderon Safran & Wright P.C.

(57) ABSTRACT

A system, method, and computer program product are configured to: provide a tablespace comprising an original partition having a lower boundary L, an upper boundary U, a split percentage P, and a split ratio R; and in response to the original partition reaching a fullness of P, automatically split the original partition to a first progeny partition and a second progeny partition, wherein the first progeny partition has a lower boundary $L_1$ that is the same as the lower boundary L of the original partition and an upper boundary $U_1$ that is determined based on whether the insert is a sequential or random insert, and wherein the second progeny partition has an upper boundaries $U_2$ that is the same as the upper boundary U of the original partition and a lower boundary $L_2$ that is determined based on whether the insert is a sequential or random insert.

20 Claims, 8 Drawing Sheets

(56) References Cited

U.S. PATENT DOCUMENTS

| | | | | |
|---|---|---|---|---|
| 10,366,053 | B1* | 7/2019 | Zheng | G06N 20/00 |
| 11,748,304 | B1* | 9/2023 | Wang | G06F 16/278 |
| | | | | 707/696 |
| 2009/0030864 | A1* | 1/2009 | Pednault | G06V 10/7625 |
| | | | | 706/45 |
| 2009/0260016 | A1* | 10/2009 | Ramakrishnan | G06F 9/5083 |
| | | | | 718/105 |
| 2010/0106934 | A1* | 4/2010 | Calder | G06F 3/0644 |
| | | | | 707/E17.014 |
| 2015/0378635 | A1* | 12/2015 | Skjolsvold | G06F 9/5061 |
| | | | | 711/173 |
| 2015/0379072 | A1* | 12/2015 | Dirac | G06N 20/00 |
| | | | | 707/693 |
| 2016/0283503 | A1* | 9/2016 | Parikh | G06F 16/2282 |
| 2018/0032560 | A1* | 2/2018 | Fang | G06F 16/2246 |
| 2022/0171792 | A1 | 6/2022 | Saxena et al. | |
| 2022/0207434 | A1* | 6/2022 | Xue | G06N 5/01 |
| 2023/0297433 | A1* | 9/2023 | Mishra | G06N 7/01 |
| | | | | 718/1 |
| 2023/0376858 | A1* | 11/2023 | Tal | G06N 20/20 |
| 2024/0020167 | A1* | 1/2024 | Ou | G06F 16/24569 |

OTHER PUBLICATIONS

BMC, "Rebalance", https://docs.bmc.com/docs/aru11200/rebalance-881419827.html, Accessed May 26, 2023; 5 Pages.

* cited by examiner

SELF-MAINTAINED TABLESPACE

BACKGROUND

Aspects of the present invention relate generally to a table space and, more particularly, to a tablespace that is self-maintained so that when a partition is becoming full, it is automatically reorganized by splitting the partition into two progeny partitions and altering partition boundaries.

A tablespace is a storage structure used to organize data in a database into logical storage groupings that relate to where data is physically stored on a system. A database stores data logically in tablespaces and physically in datafiles associated with the corresponding tablespace. Large tablespace may be divided into partitions to improve query performance and control costs by reducing the number of bytes read by a query. Different tablespace partition schemes include range partition table, list partition table, hash partition table, partition by growth, etc.

SUMMARY

In a first aspect of the invention, there is a computer-implemented method including: providing, by a processor set, a tablespace comprising an original partition, the original partition having a lower boundary L, an upper boundary U, a split percentage P, and a split ratio R; and in response to the original partition reaching a fullness of P, automatically splitting, by the processor set, the at least one original partition to a first progeny partition and a second progeny partition, wherein the first progeny partition has a lower boundary $L_1$ that is the same as the lower boundary L of the original partition and an upper boundary $U_1$ that is determined based on whether the insert is a sequential insert or a random insert, and wherein the second progeny partition has an upper boundary $U_2$ that is the same as the upper boundary U of the original partition and a lower boundary $L_2$ that is determined based on whether the insert is the sequential insert or the random insert.

In another aspect of the invention, there is a computer program product including one or more computer readable storage media having program instructions collectively stored on the one or more computer readable storage media. The program instructions are executable to: provide a tablespace comprising an original partition, the original partition having a lower boundary L, an upper boundary U, a split percentage P, and a split ratio R; and in response to the original partition reaching a fullness of P, automatically split the at least one original partition to a first progeny partition and a second progeny partition, wherein the first progeny partition has a lower boundary $L_1$ that is the same as the lower boundary L of the original partition and an upper boundary $U_1$ that is determined based on whether the insert is a sequential insert or a random insert, and wherein the second progeny partition has an upper boundaries $U_2$ that is the same as the upper boundary U of the original partition and a lower boundary $L_2$ that is determined based on whether the insert is the sequential insert or the random insert.

In another aspect of the invention, there is a system including a processor set, one or more computer readable storage media, and program instructions collectively stored on the one or more computer readable storage media. The program instructions are executable to: provide a tablespace comprising an original partition, the original partition having a lower boundary L, an upper boundary U, a split percentage P, and a split ratio R; and in response to the original partition reaching a fullness of P, automatically split the at least one original partition to a first progeny partition and a second progeny partition, wherein the first progeny partition has a lower boundary $L_1$ that is the same as the lower boundary L of the original partition and an upper boundary $U_1$ that is determined based on whether the insert is a sequential insert or a random insert, and wherein the second progeny partition has an upper boundaries $U_2$ that is the same as the upper boundary U of the original partition and a lower boundary $L_2$ that is determined based on whether the insert is the sequential insert or the random insert.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
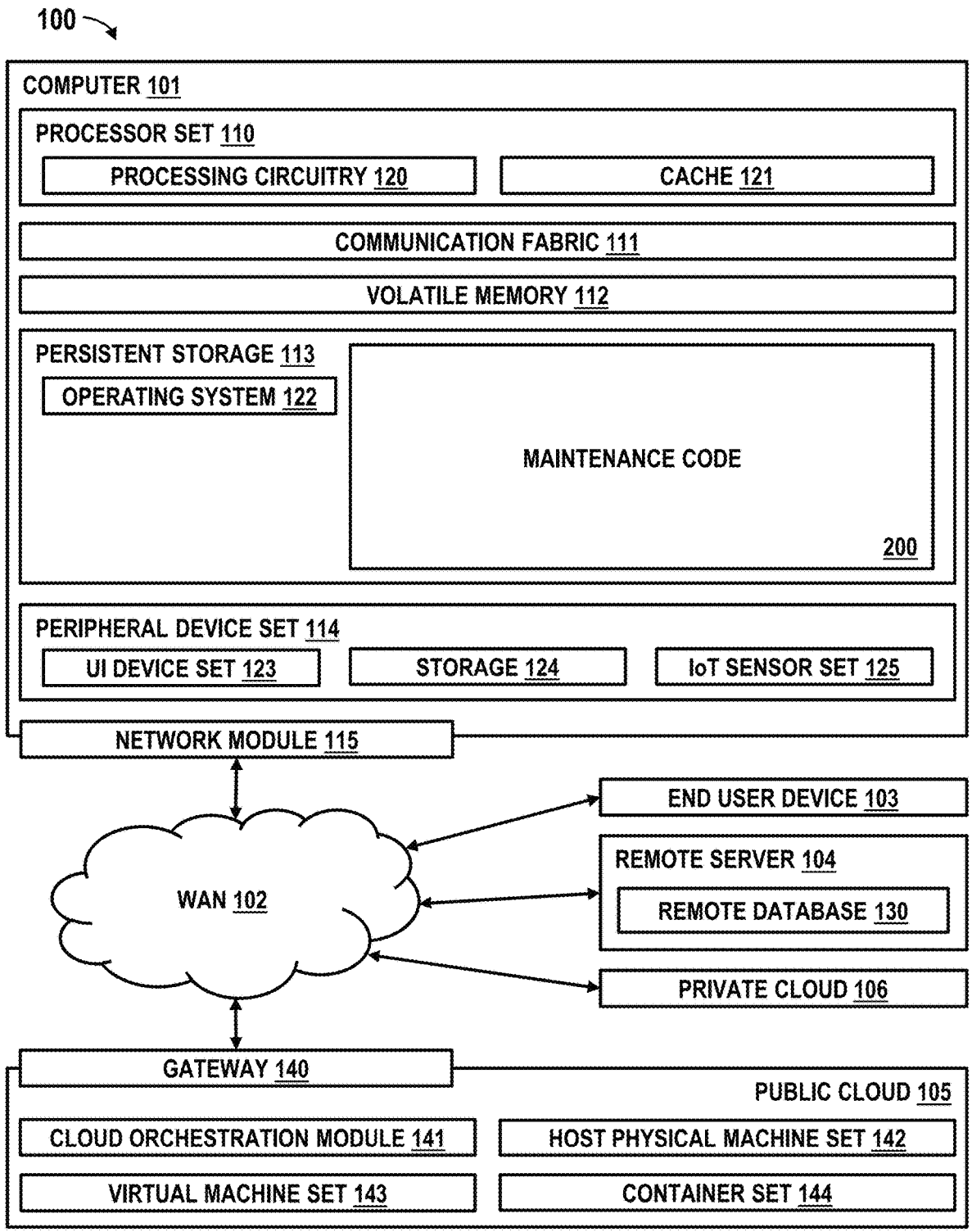
FIG. 1 depicts a computing environment according to an embodiment of the present invention.

Aspects of the present invention relate generally to tablespaces and, more particularly, to tablespaces that are self-maintained. Many methods exist for dividing a tablespace into partitions including range partition table, list partition table, hash partition table, partition by growth, etc. Once a partition is full, new data cannot be added to the full partition, unless the data is redistributed. The process for redistributing the data is usually conducted by a database administrator in maintaining the database and requires labor costs. It is desirable to have an automatic and reliable way to detect and reorganize partitions in advance of a partition becoming full.

Aspects of the present invention provide systems and methods for partitions within a tablespace to maintain itself and to automatically reorganize itself before becoming full. The self-maintenance provides optimal performance for the tablespace without requiring reorganization or rebalancing by an administrator. In embodiments, the system monitors the tablespace to automatically detect any partitions becoming full and split that partition accordingly at irregular time intervals. The self-maintained partitions allow for ease of database maintenance and improved user's experience, as the user will not need to worry about setting boundaries for partitions and performing the complex process to rebalance partitions.

In accordance with aspects of the invention, a method, system, and computer program product are configured to: provide a tablespace comprising an original partition, the original partition having a lower boundary L, an upper boundary U, a split percentage P, and a split ratio R; and in response to the original partition reaching a fullness of P, automatically split the at least one original partition to a first progeny partition and a second progeny partition, wherein the first progeny partition has a lower boundary $L_1$ that is the same as the lower boundary L of the original partition and an upper boundary $U_1$ that is determined based on whether the insert is a sequential insert or a random insert, and wherein the second progeny partition has an upper boundaries $U_2$ that is the same as the upper boundary U of the original partition and a lower boundary $L_2$ that is determined based on whether the insert is a sequential insert or a random insert. Providing the tablespace having a split percentage and a split ratio advantageously provides the original partition in the tablespace the ability to automatically split itself into progeny partitions when the split percentage is reached.

In embodiments, the split percentage P and the split ratio R are determined by a machine learning model. In this manner, the split percentage P and the split ratio R can be efficiently determined using historical statistics, data collection activities, and data history of the tablespace extension.

In embodiments, the machine learning model considers partition size, history of insert volume, frequency of insert on the original partition, and history of elapsed time of a split to determine the split percentage P. In this manner, a spit percentage P is determined for an efficient split of the partition.

In embodiments, the machine learning model considers the history of insert distribution and current key distribution of the original partition to determine the split ratio R. In this manner, a split ratio R is determined for an efficient split of the partition.

In embodiments, the first progeny partition and second progeny partition retain the split percentage P and the split ratio R. In this manner, the progeny partitions may also be advantageously and automatically split into further partitions on becoming full.

In embodiments, in response to the insert being a random insert, the upper boundary $U_1$ of the first progeny partition is $(U-1)/2-1$, and the lower boundary $L_2$ of the second progeny partition is $(U-1)/2$. In this manner, the upper and lower boundaries of the progeny partitions are advantageously reset for further random inserts.

In embodiments, in response to the insert being a sequential insert and the original partition being a middle partition, the upper boundary $U_1$ of the first progeny partition is $R*U$, and the lower boundary $L_2$ of the second progeny partition is $R*U+1$. In this manner, the upper and lower boundaries of the progeny partitions are advantageously reset for further sequential inserts into a middle partition.

In embodiments, in response to the insert being an ascending sequential insert and the original partition being a first or last partition, the upper boundary $U_1$ of the first progeny partition is an index i of the last insert recorded in the original partition, and the lower boundary $L_2$ of the second progeny partition is i+1. In this manner, the upper and lower boundaries of the progeny partitions are advantageously reset for further ascending sequential inserts into a first or last partition.

In embodiments, in response to the insert being a descending sequential insert and the original partition being a first or last partition, the lower boundary $L_2$ of the second progeny partition is an index i of the last insert recorded in the original partition, and upper boundary $U_1$ of the first progeny partition is i-1. In this manner, the upper and lower boundaries of the progeny partitions are advantageously reset for further sequential inserts into a middle partition. In this manner, the upper and lower boundaries of the progeny partitions are advantageously reset for further descending sequential inserts into a first or last partition.

Implementations of the invention are necessarily rooted in computer technology. For example, the steps of creating a tablespace and splitting partitions are computer-based and cannot be performed in the human mind. For example, a tablespace is a logical storage unit in a database. As such, a tablespace must necessarily be part of a database and not in the human mind. Moreover, training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. Values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as maintenance code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
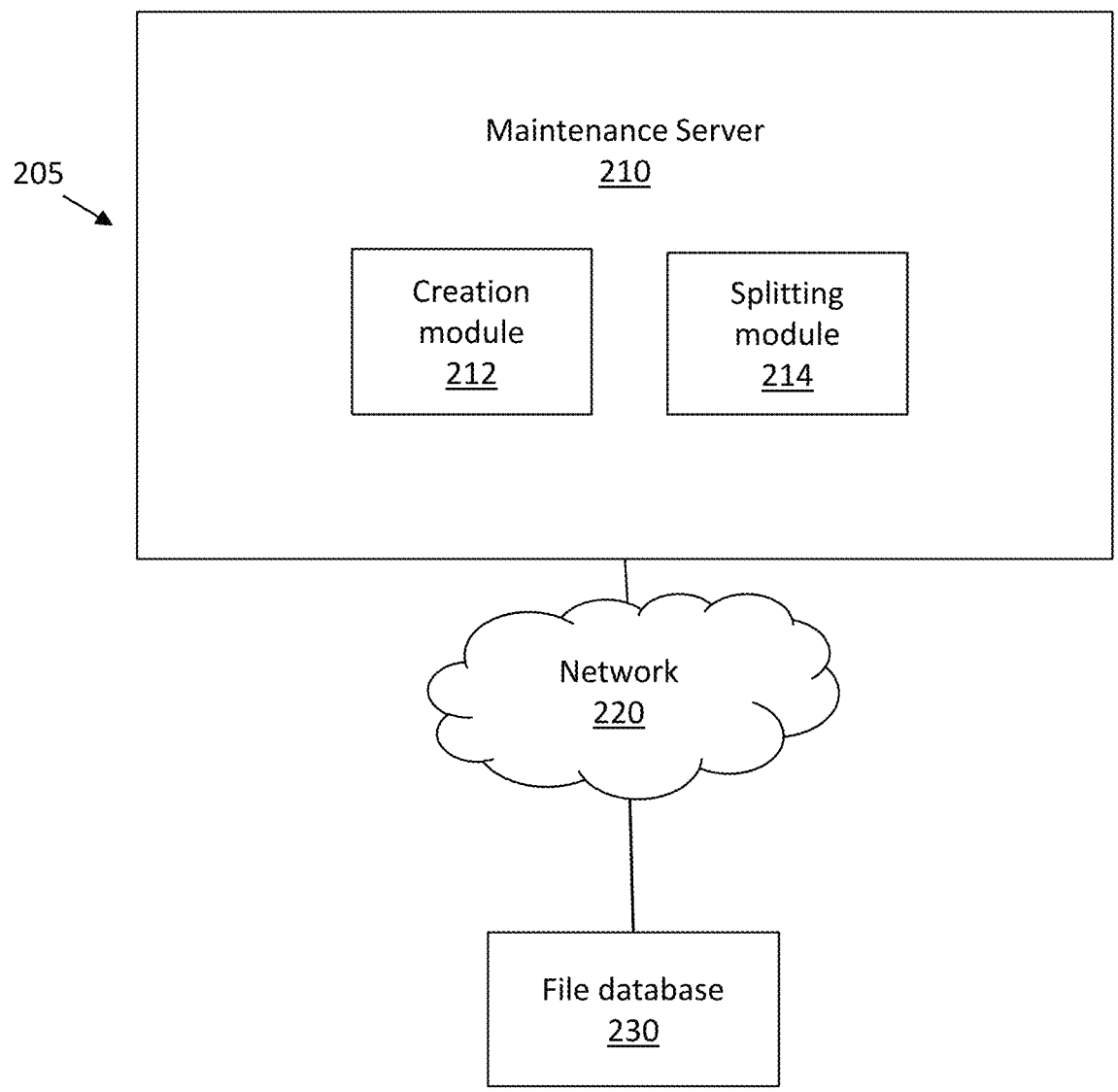
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes a maintenance server 210 and a file database 230. The maintenance server 210 and the file database 230 are in communication over a network 220. In an example, the maintenance server 210 comprises one or more instances of the computer 101 of FIG. 1, or one or more virtual machines or one or more containers running on one or more instances of the computer 101 of FIG. 1. The file database 230 may comprise one or more instances of the remote database 130 of FIG. 1. The network 220 may comprise one or more networks such as the WAN 102 of FIG. 1.

In embodiments, the file database 230 of FIG. 2 includes electronic files that are stored in the file database 230. The files may include a variety of data or records relevant to a variety of industries, businesses, personal data, data in general, or the like. The files may include, for example, business records that are created and received as part of a business daily operation. The documents may be identification cards, driver's licenses, invoices, contracts, business cards, mailing labels, letter, etc.

In embodiments, the maintenance server 210 creates a tablespace for the file database 230 and maintains that tablespace by splitting partitions in the tablespace before the partitions are completely full as data are saved to and accumulate in the file database 230. That way, each partition is automatically reorganized before becoming full, so that data can continuously be inserted into the file database 230 without interruption. In particular, the maintenance server 210 of FIG. 2 comprises a creation module 212 and a splitting module 214, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The maintenance server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the creation module 212 creates a tablespace for the files in the file database 230. The tablespace may include one or more partitions to improve query performance and control costs. Each partition specifies a lower boundary L, an upper boundary U, a split percentage P, and a split ratio R. The split percentage defines the percent of a partition that is full to trigger a split of the partition into its progeny partitions. For example, if Partition 1 has a split percentage of 80%, then Partition 1 would be split into two progeny partitions (e.g., Partition 2 and Partition 3) when Partition 1 reaches 80% full. The split ratio R is the ratio of a partition that goes into the progeny partitions after the split. For example, if Partition 1 has a split ratio R of 0.8 (i.e., 0.8:1), then when Partition 1 is split, 80% of the data in Partition 1 goes into Partition 2 and 20% of the data in Partition 1 goes into Partition 3. The lower boundary L and upper boundary U are defined when the tablespace is created. The split percentage P and split ratio R may be defined when the tablespace is created or determined based on machine learning as disclosed below. If split percentage P and split ratio R are defined when the tablespace is created, then those values are constant. If the split percentage P and split ratio R are determined by machine learning, then those values may be changed after each split.

Figure 3:
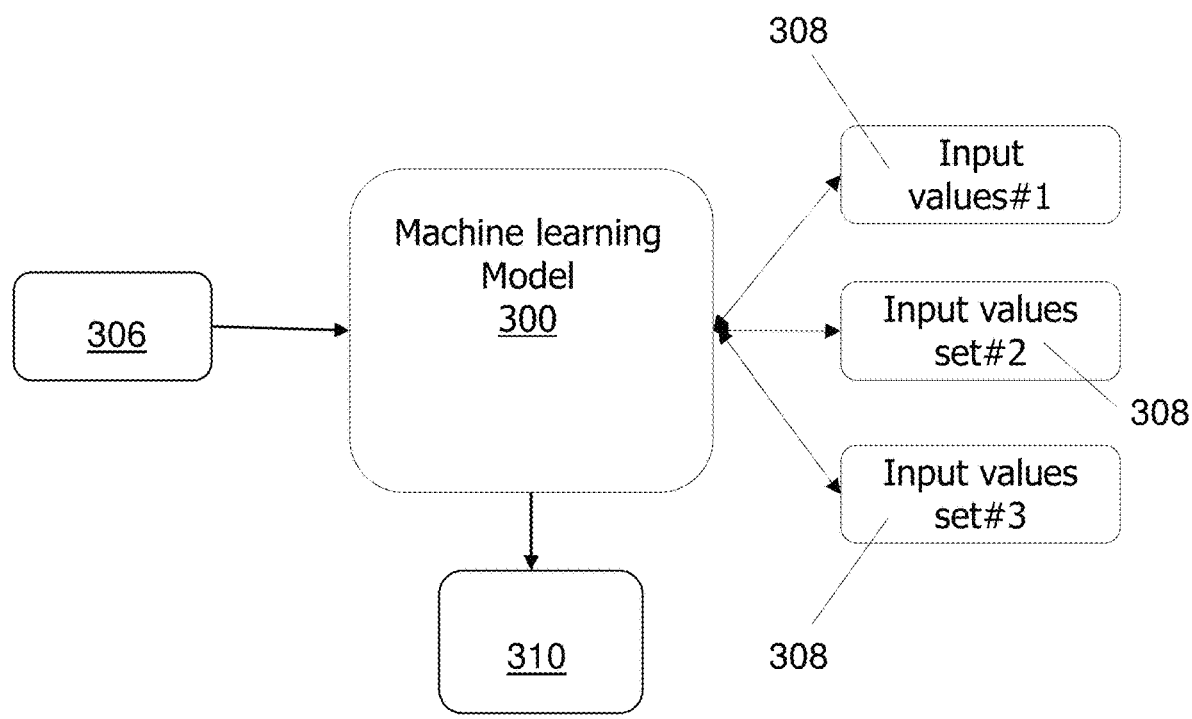
FIG. 3 shows a training regimen for a machine learning model in accordance with aspects of the present invention.

In embodiments, the split percentage P and split ratio R may be determined by machine learning. FIG. 3 shows an exemplary training regimen for a machine learning model 300 to determine and predict split percentage and split ratio 310. To train the machine learning model 300, statistics, data collection activities, and data history (collected information 306) of the tablespace extension and splits are collected. From the collected information 306, features 308, such as historical input values for queries, customer segments, previous workload, etc., can be extracted. The extracted features 308 and collected information 306 may be used to train the machine learning model to determine the split percentage P and split ratio R 310. The machine learning model 300 may be, but is not limited to, a decision tree, a random forest, an artificial neural network, a support vector machine (SVM), etc. In training the machine learning model 300, factors impacting the split percentage include, but are not limited to, partition size, history of insert volume, and frequency of insert (for the partition); factors impacting split ratio include, but are not limited to, history of insert distribution and current key distribution. In embodiments, those factors, in addition to the past split percentages and split ratios, are used to train a machine learning classification algorithm which may include a machine learning model. With the machine learning classification algorithm, a new hybrid database may use existing predicted split percentage and split ratio to avoid lengthy machine learning training. In embodiments, new databases performing similar workloads may reuse a database-specific trained model from previously established databases to minimize lengthy machine learning training. The machine learning model 300 is continuously updated after every split to determine the split percentage P and split ratio R for the next split event.

Figure 4:
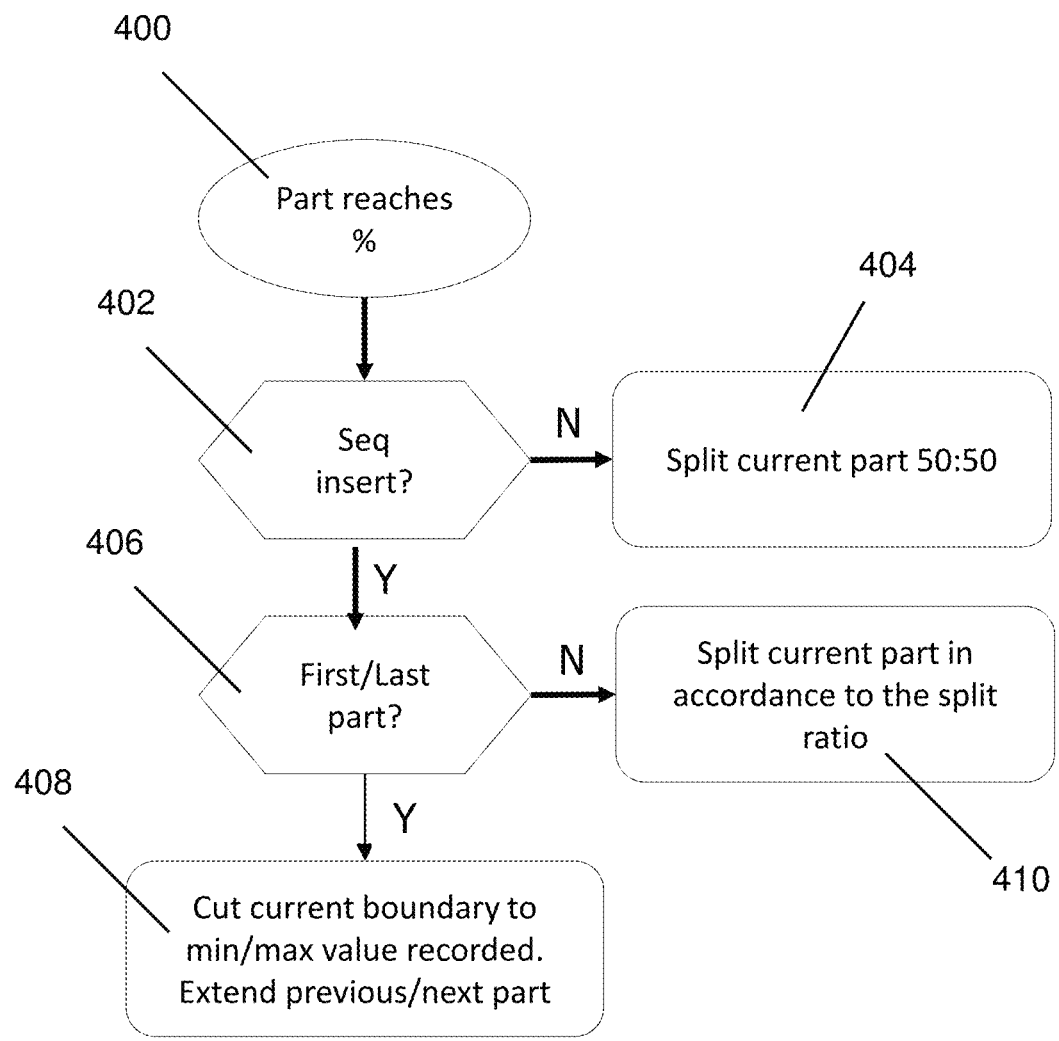
FIG. 4 shows a flow diagram showing the logic of a splitting module in accordance with aspects of the present invention.

In embodiments, the splitting module 214 monitors the capacity of the partitions in the tablespace and automatically splits any partition that reaches the split percentage. FIG. 4 is a flow diagram showing an exemplary logic of the splitting module 214. In box 400, the splitting module 214 detects that the partition reaches the split percentage. In box 402, the splitting module 214 determines whether the incoming insert is a sequence insert (ascending or descending), such as by detecting whether a series of inserts add keys in ascending or descending sequential order into an index. Here, the incoming insert is an insert into the partition that allows the partition to reach a fullness of at least the split partition or of partition ratio R. If it is neither (a random insert), then in box 404, the partition is split into two equal progeny partitions, each containing half of the parent (original) partition, as explained in detail below and in FIG. 5. If the insert is a sequential insert, then in box 406 the splitting module 214 determines whether the partition is the first or last partition by checking the position of the partition within the table space. If the partition is the first or last partition, then, in box 408, the partition is split into two progeny partitions where the boundaries of the first progeny are reorganized as explained in detail below and in FIG. 5. If the partition is not the first or last partition (a middle partition), then the partition is split in accordance to the split ratio (as explained in detail below and in FIG. 5).

An insert into a partition may be an ascending sequence insert, a descending sequence insert, or a random insert. An ascending sequence insert means that the insert is added to the partition in ascending order. A descending sequential insert means that the insert is added to the partition is decreasing order. A random insert means that the insert is added to partition in the middle of the index sequence.

Figure 5:
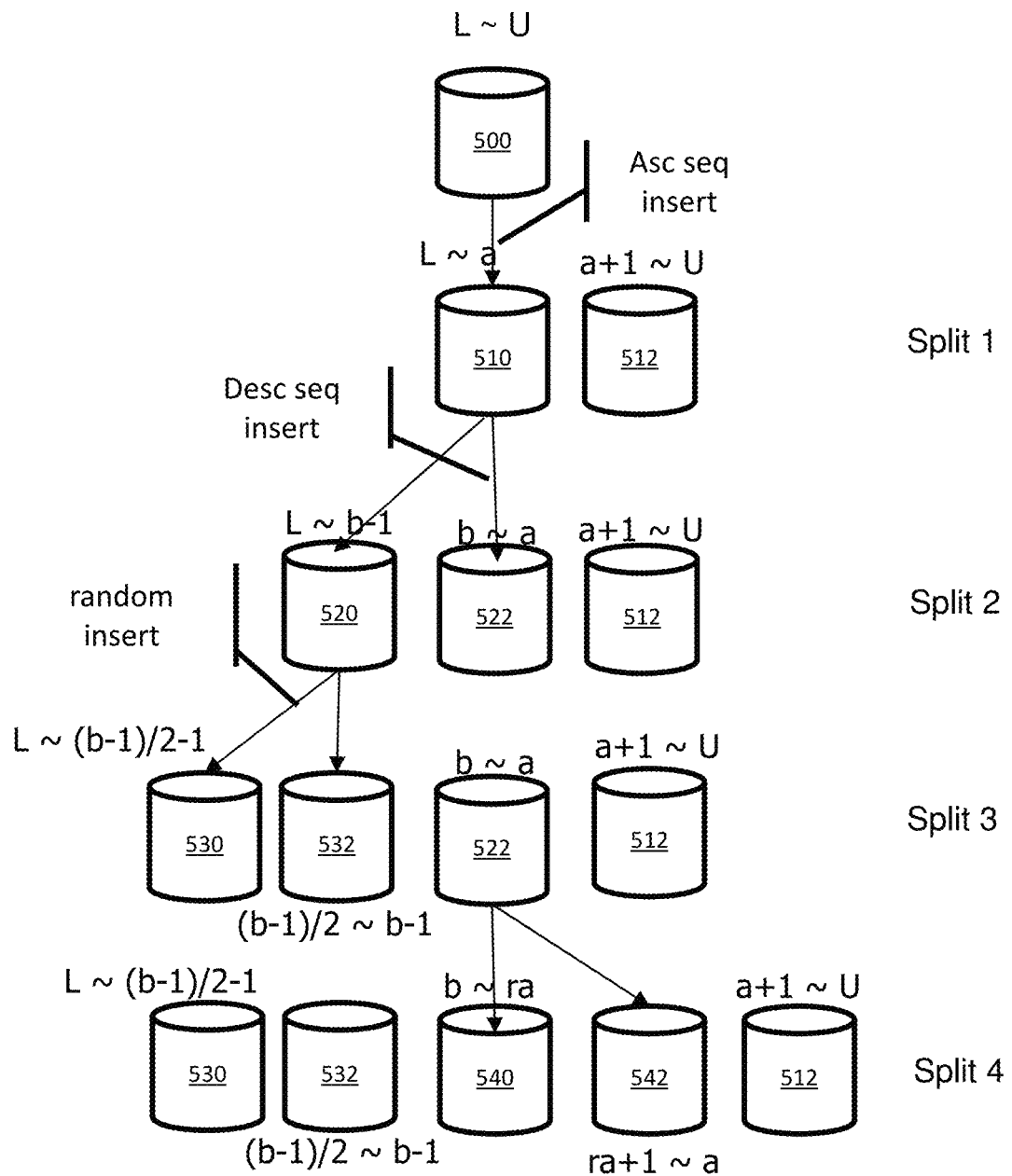
FIG. 5 shows examples of splits from an original partition in accordance with aspects of the present invention.

FIG. 5 shows an example of four splits from an original partition 500. The original partition 500 has a lower boundary of L, an upper boundary of U, a split percentage of P (P is a percentage, e.g., 80%) and a split ratio of R (R is a decimal between 0 and 1, e.g., 0.8). When the original portion 500 is filled up to the split percentage P, the next insert triggers an automatic split (Split 1) of the partition 500 to two progeny partitions 510 and 512. In FIG. 5, the insert of Split 1 is an ascending sequential insert. Because the original partition 500 is the only partition, it could be considered either the first or last partition (but not a middle partition) (see box 406 of FIG. 4). In that case (ascending sequential insert and first/last partition), the original partition 500 is divided into two progeny partitions 510 and 212 (see box 408 of FIG. 4). The partition 510 has a lower boundary of Min and an upper boundary of a (L~a); and the partition 512 has a lower boundary of a+1 and an upper boundary of U (a+1~U). The value a is the index of the last insert added to the original partition 500. The progeny partitions 510 and 512 may retain the split percentage P and split ratio R, respectively, of the original partition 500. In embodiments, progeny partitions 510 and 512 may have differing split percentage P and split ratio R than the original partition 500. Thus, after Split 1, partitions 510 and 512 replaces the original partition 500.

Continuing with FIG. 5, Split 2 illustrates a descending sequence insert into partition 510 in which the P is full. In split 2, partition 510 is the first partition and partition 512 is the last partition. In that case (descending insert and first/last partition), partition 510 is split into partitions 520 and 522 (see box 408 of FIG. 4). Because partition 510 is the first partition and the insert is a sequence insert, partition 520 retains a lower boundary of L and an upper boundary of b−1 (L~b−1); and partition 522 has a lower boundary of b and an upper boundary of a (b~a). The value b is the index of the last insert added to partition 510. The progeny partitions 520 and 522 may retain the split percentage P and split ratio R, respectively. In embodiments, progeny partitions 510 and 512 may have differing split percentage P and split ratio R than the original partition 500. After Split 2, partitions 520, 522, and 512 replaces the original partition 500, where partition 520 is the first partition and partition 512 is the last partition.

Continuing with FIG. 5, Split 3 illustrates a random insert into partition 520. Because this is a random insertion, the partition 520 is split equally into two progeny partitions 530 and 532 (see box 404 of FIG. 4). In this case, partition 530 has a lower boundary of L and an upper boundary of (b−1)/2−1 (L~ (b−1)/2−1); and partition 532 has a lower boundary of (b−1)/2 and an upper boundary of b−1 ((b−1)/2~b−1). The progeny partitions 530 and 532 may retain the split percentage P and split ratio R, respectively. In embodiments, progeny partitions 510 and 512 may have differing split percentage P and split ratio R than the original partition 500. After Split 3, partitions 530, 532, 522, and 512 replaces the original partition 500, where partition 530 is the first partition and partition 512 is the last partition.

Continuing with FIG. 5, Split 4 illustrates an insert into partition 522 which is neither the first nor last partition (partition 522 is a middle partition). In that case, partition 522 is split according to the split ratio (0.8 for this example) (see box 410 of FIG. 4). As such, partition 522 is split into partitions 540 and 542. Partition 540 has a lower boundary of b and an upper boundary of Ra; and partition 542 has a lower boundary of Ra+1 and an upper boundary of a. The value R is the split ratio. The progeny partitions 540 and 542 may retain the split percentage P and split ratio R, respectively, of the original partition 500. In embodiments, progeny partitions 510 and 512 may have differing split percentage P and split ratio R than the original partition 500. After Split 3, partitions 530, 532, 540, 542, and 512 replaces the original partition 500, where partition 530 is the first partition and partition 512 is the last partition.

In the description above of FIG. 5, the progeny partitions retain the split percentage P and split ratio R, respectively, of the original partition 500. But that need not be the case. For example, in embodiments where the split percentage P and split ratio R are determined by a machine learning model, the split percentage P and split ratio R may change after each split as the machine learning model is continuously being trained and refined after each split.

Figure 6:
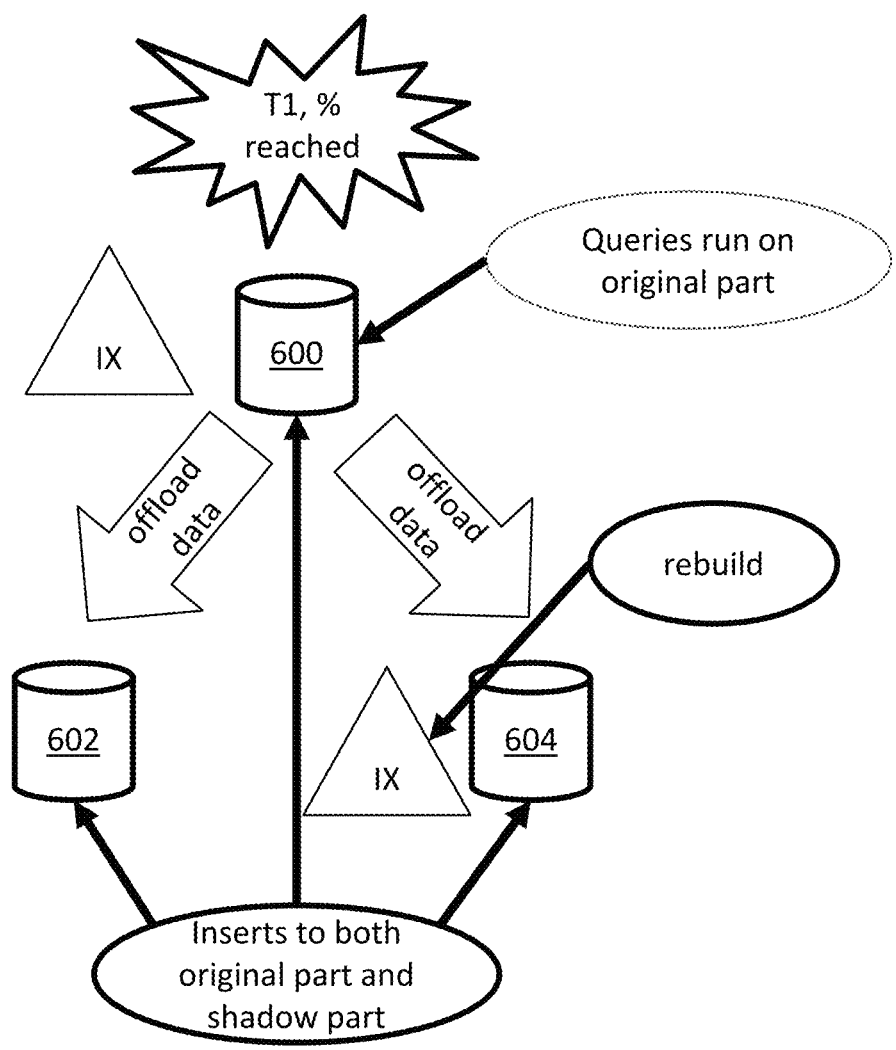
FIG. 6 shows a diagram of the original and progeny partitions during a split in accordance with aspects of the present invention.
Figure 7:
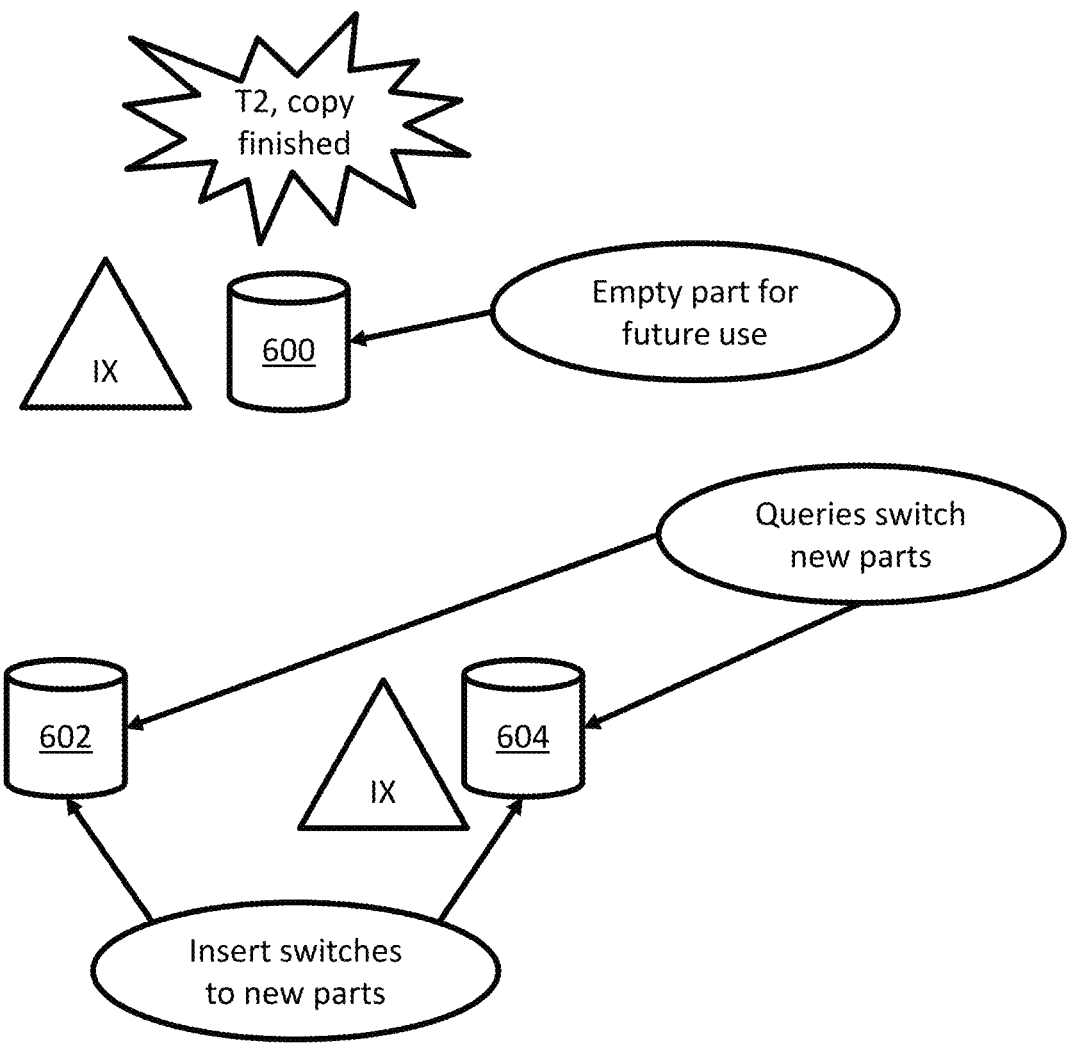
FIG. 7 shows a diagram of the original and progeny partitions after a split is completed in accordance with aspects of the present invention.

In embodiments, it is desirable for a partition to be available for queries and data insertions during splits. In that case, as shown in FIG. 6, while data from the original partition 600 is being offloaded (copied) to progeny partitions 602 and 604, queries may still be run on the original partition. Any new insert (insert added during the split) is added to both the original partition 600 and the progeny partitions 602 and 604 at the same time. To prevent the new insert from being copied to the progeny partitions 602 and 604, the new insert is marked with a special header so that the copy process does not copy the new insert to the progeny partitions 602 and 604. Additionally, the copying of the data for the first half to the progeny partition 602 can start from the top of the partition 600, and the copying of the data for the second half to the progeny partition 604 can start from the bottom of the original partition 600. Once the split is completed (i.e., the offloading process has completely copied all the data of the original partition 600 to the progeny partitions 602 and 604), as shown in FIG. 7, the original partition 600 is emptied and may be saved for future use. The progeny partitions 602 and 604 are then used for any queries after the completion of the split.

Figure 8:
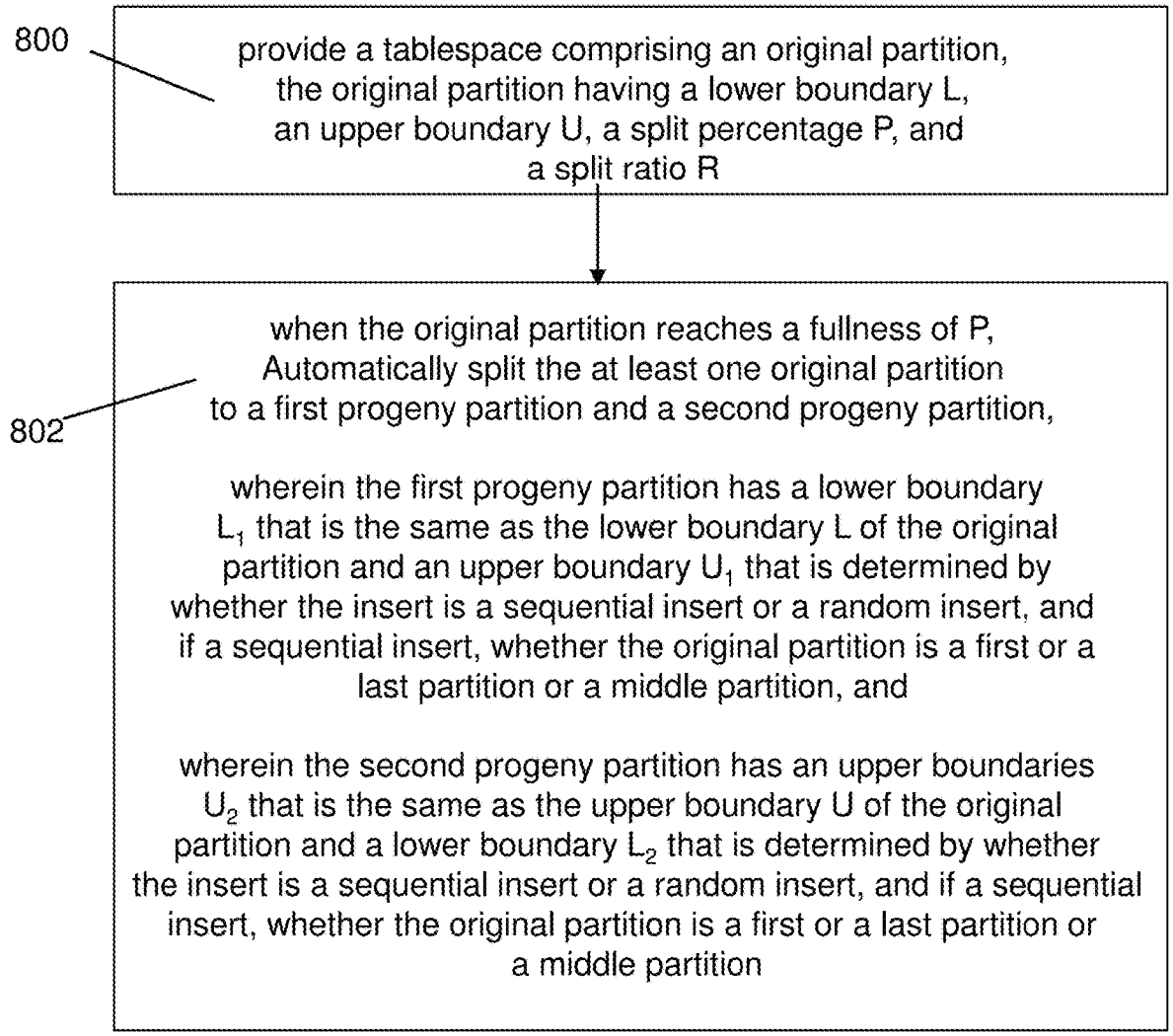
FIG. 8 shows a flowchart of an exemplary method in accordance with aspects of the present invention.

FIG. 8 shows a flowchart of an exemplary method in accordance with aspects of the present invention. Steps of the method may be carried out in the environment of FIG. 2 and are described with reference to elements depicted in FIG. 2.

At step 800, a tablespace is provided. That table space comprises an original partition having a lower boundary L, an upper boundary U, a split percentage P, and a split ratio R. In embodiments, and as described with respect to FIG. 2, the creation module 212 performs this step.

At step 802, when the original partition reaches at least a fullness of the split percentage P, the original partition is automatically split to a first progeny partition and a second progeny partition. The first progeny partition has a lower boundary $L_1$ that is the same as the lower boundary L of the original partition and an upper boundary $U_1$ that is determined by whether the insert is a sequential insert or a random insert, and if a sequential insert, whether the original partition is a first or a last partition or a middle partition. The second progeny partition has an upper boundary $U_2$ that is the same as the upper boundary U of the original partition and a lower boundary $L_2$ that is determined by whether the insert is a sequential insert or a random insert, and if a sequential insert, whether the original partition is a first or a last partition or a middle partition. In embodiments, and as described with respect to FIG. 2, the splitting module 214 performs this step.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising
    training, by a processor set, a machine learning model using a machine learning classification algorithm which uses an existing predicted split percentage and an existing predicted split ratio of a tablespace, wherein the machine learning model is continuously trained after a split to determine a predicted split percentage and a predicated split ratio for a next split event;
    providing, by the processor set, the tablespace comprising an original partition, the original partition having a lower boundary L, an upper boundary U, a split percentage P, and a split ratio R using the trained machine learning model;
    monitoring, by the processor set, a capacity of partitions in the tablespace; and
    in response to the original partition reaching a fullness of P based on the monitored capacity of partitions in the tablespace, automatically splitting, by the processor set, the original partition to a first progeny partition and a second progeny partition,
    wherein the first progeny partition has a lower boundary $L_1$ that is the same as the lower boundary L of the original partition and an upper boundary $U_1$ that is determined based on whether an insert is a sequential insert or a random insert, and
    wherein the second progeny partition has an upper boundary $U_2$ that is the same as the upper boundary U of the original partition and a lower boundary $L_2$ that is determined based on whether the insert is the sequential insert or the random insert,
    the machine learning model further comprises a support vector machine (SVM),
    the machine learning model is trained using partition size, history of insert volume, and frequency of insert for determining and outputting the predicted split percentage, and
    the machine learning model is trained using history of insert distribution and current key distribution for determining and outputting the predicted split ratio.

2. The computer-implemented method of claim 1, further comprising collecting, by the processor set, data history of the tablespace, wherein the data history comprises historical input values for queries, previous workload, previous tablespace extension data, and previous split data, wherein the split percentage P and the split ratio R are determined by the trained machine learning model.

3. The computer-implemented method of claim 2, wherein the trained machine learning model considers the partition size, the history of insert volume, the frequency of insert on the original partition, and history of elapsed time of the split to determine the split percentage P, and the trained machine learning model further comprises an artificial neural network.

4. The computer-implemented method of claim 2, wherein the trained machine learning model considers the history of insert distribution and the current key distribution of the original partition to determine the split ratio R.

5. The computer-implemented method of claim 2, wherein the first progeny partition and the second progeny partition retain the split percentage P and the split ratio R.

6. The computer-implemented method of claim 1, wherein in response to the insert being the random insert, the upper boundary $U_1$ of the first progeny partition is (U−1)/2−1, and the lower boundary $L_2$ of the second progeny partition is (U−1)/2.

7. The computer-implemented method of claim 1, wherein in response to the insert being the sequential insert and the original partition being a middle partition, the upper boundary $U_1$ of the first progeny partition is R*U, and the lower boundary $L_2$ of the second progeny partition is R*U+1.

8. The computer-implemented method of claim 1, wherein in response to the insert being an ascending sequential insert and the original partition being a first partition or last partition, the upper boundary $U_1$ of the first progeny partition is an index i of a last insert recorded in the original partition, and the lower boundary $L_2$ of the second progeny partition is i+1.

9. The computer-implemented method of claim 1, wherein in response to the insert being a descending sequential insert and the original partition being a first partition or last partition, the lower boundary $L_2$ of the second progeny partition is an index i of a last insert recorded in the original partition, and upper boundary $U_1$ of the first progeny partition is i−1.

10. A computer program product comprising one or more computer readable storage media having program instructions collectively stored on the one or more computer readable storage media, the program instructions executable to:
    train a machine learning model using a machine learning classification algorithm which uses an existing predicted split percentage and an existing predicted split ratio of a tablespace, wherein the machine learning model is trained after a split to determine a predicted split percentage and a predicated split ratio for a next split event;

provide the tablespace comprising an original partition, the original partition having a lower boundary L, an upper boundary U, a split percentage P, and a split ratio R using the trained machine learning model;

monitor a capacity of partitions in the tablespace; and in response to the original partition reaching a fullness of P based on the monitored capacity of partitions in the tablespace, automatically split the original partition to a first progeny partition and a second progeny partition, wherein the first progeny partition has a lower boundary $L_1$ that is the same as the lower boundary L of the original partition and an upper boundary $U_1$ that is determined based on whether an insert is a sequential insert or a random insert, and wherein the second progeny partition has an upper boundaries $U_2$ that is the same as the upper boundary U of the original partition and a lower boundary $L_2$ that is determined based on whether the insert is the sequential insert or the random insert, the machine learning model is trained using partition size, history of insert volume, and frequency of insert for determining and outputting the predicted split percentage, and the machine learning model is trained using history of insert distribution and current key distribution for determining and outputting the predicted split ratio.

11. The computer program product of claim 10, wherein the program instructions are further executable to collect data history of the tablespace, and the data history comprises historical input values for queries, previous workload, previous tablespace extension data, and previous split data, wherein in response to the insert being the random insert, the upper boundary $U_1$ of the first progeny partition is $(U-1)/2-1$, and the lower boundary $L_2$ of the second progeny partition is $(U-1)/2$.

12. The computer program product of claim 10, wherein in response to the insert being the sequential insert and the original partition being a middle partition, the upper boundary $U_1$ of the first progeny partition is R*U, and the lower boundary $L_2$ of the second progeny partition is R*U+1, and the trained machine learning model further comprises an artificial neural network.

13. The computer program product of claim 10, wherein in response to the insert being an ascending sequential insert and the original partition being a first partition or last partition, the upper boundary $U_1$ of the first progeny partition is an index i of a last insert recorded in the original partition, and the lower boundary $L_2$ of the second progeny partition is i+1.

14. The computer program product of claim 10, wherein in response to the insert being a descending sequential insert and the original partition being a first partition or last partition, the lower boundary $L_2$ of the second progeny partition is an index i of a last insert recorded in the original partition, and upper boundary $U_1$ of the first progeny partition is i−1.

15. A system comprising a processor set, one or more computer readable storage media, and program instructions collectively stored on the one or more computer readable storage media, the program instructions executable to:

train a machine learning model using a machine learning classification algorithm which uses an existing predicted split percentage and an existing predicted split ratio of a tablespace, wherein the machine learning model is continuously trained after a split to determine a predicted split percentage and a predicated split ratio for a next split event;

provide the tablespace comprising an original partition, the original partition having a lower boundary L, an upper boundary U, a split percentage P, and a split ratio R using the trained machine learning model;

monitor a capacity of partitions in the tablespace; and in response to the original partition reaching a fullness of P based on the monitored capacity of partitions in the tablespace, automatically split the original partition to a first progeny partition and a second progeny partition, and the machine learning model is trained using partition size, history of insert volume, and frequency of insert for determining and outputting the predicted split percentage.

16. The system of claim 15, further comprising collecting, by the processor set, data history of the tablespace, and the data history comprises historical input values for queries, previous workload, previous tablespace extension data, and previous split data, wherein the first progeny partition has a lower boundary $L_1$ that is the same as the lower boundary L of the original partition and an upper boundary $U_1$ that is determined based on whether an insert is a sequential insert or a random insert, wherein the second progeny partition has an upper boundaries $U_2$ that is the same as the upper boundary U of the original partition and a lower boundary $L_2$ that is determined based on whether the insert is the sequential insert or the random insert, and wherein when the insert is a random insert, the upper boundary $U_1$ of the first progeny partition is $(U-1)/2-1$, and the lower boundary $L_2$ of the second progeny partition is $(U-1)/2$.

17. The system of claim 15, wherein the first progeny partition has a lower boundary $L_1$ that is the same as the lower boundary L of the original partition and an upper boundary $U_1$ that is determined based on whether an insert is a sequential insert or a random insert, wherein the second progeny partition has an upper boundaries $U_2$ that is the same as the upper boundary U of the original partition and a lower boundary $L_2$ that is determined based on whether the insert is the sequential insert or the random insert, and wherein in response to the insert being a sequential insert and the original partition being a middle partition, the upper boundary $U_1$ of the first progeny partition is R*U, and the lower boundary $L_2$ of the second progeny partition is R*U+1.

18. The system of claim 15, wherein the first progeny partition has a lower boundary $L_1$ that is the same as the lower boundary L of the original partition and an upper boundary $U_1$ that is determined based on whether an insert is a sequential insert or a random insert, wherein the second progeny partition has an upper boundaries $U_2$ that is the same as the upper boundary U of the original partition and a lower boundary $L_2$ that is determined based on whether the insert is the sequential insert or the random insert, and wherein in response to the insert being an ascending sequential insert and the original partition being a first partition or last partition, the upper boundary $U_1$ of the first progeny partition is an index i of a last insert recorded in the original partition, and the lower boundary $L_2$ of the second progeny partition is i+1.

19. The system of claim 15, wherein the first progeny partition has a lower boundary $L_1$ that is the same as the lower boundary L of the original partition and an upper boundary $U_1$ that is determined based on whether an insert is a sequential insert or a random insert,
 wherein the second progeny partition has an upper boundaries $U_2$ that is the same as the upper boundary U of the original partition and a lower boundary $L_2$ that is determined based on whether the insert is the sequential insert or the random insert, and
 wherein in response to the insert being an descending sequential insert and the original partition being a first partition or last partition, the lower boundary $L_2$ of the second progeny partition is an index i of a last insert recorded in the original partition, and upper boundary $U_1$ of the first progeny partition is i−1.

20. The system of claim 15, wherein the split percentage P and the split ratio R are determined by the trained machine learning model, and the trained machine learning model further comprises an artificial neural network.

\* \* \* \* \*